(12) United States Patent
Lu et al.

(10) Patent No.: US 7,086,738 B2
(45) Date of Patent: Aug. 8, 2006

(54) OPTICAL PROJECTION SYSTEM AND METHOD

(75) Inventors: Ho Lu, Baoshan Township, Hsinchu County (TW); Chung-Jung Chen, Sanchong (TW); Shih-Po Yeh, Longtan Township, Taoyuan County (TW)

(73) Assignee: United Microelectronics Corp., Hsinchu (TW)

( * ) Notice: Subject to any disclaimer, the term of this patent is extended or adjusted under 35 U.S.C. 154(b) by 226 days.

(21) Appl. No.: 10/782,348

(22) Filed: Feb. 18, 2004

(65) Prior Publication Data
US 2005/0180030 A1    Aug. 18, 2005

(30) Foreign Application Priority Data
Feb. 5, 2004    (TW) .............................. 93102568 A

(51) Int. Cl.
G03B 21/28 (2006.01)
G03B 21/26 (2006.01)
H04N 17/02 (2006.01)
G02B 5/30 (2006.01)
G02B 27/28 (2006.01)
G02B 1/00 (2006.01)
G02B 5/28 (2006.01)

(52) U.S. Cl. .............................. 353/33; 353/20; 353/34; 353/37; 353/51; 353/73; 353/81; 353/82; 353/84; 348/5; 348/193; 359/583; 359/584; 359/495; 359/589; 359/629; 359/639

(58) Field of Classification Search .................. 353/31, 353/20, 33, 34, 37–38, 51, 73, 78, 81–82, 353/84, 99, 121; 348/5, 193; 359/495, 349, 359/583–584, 589, 629, 636, 639; 349/5, 349/8–9
See application file for complete search history.

(56) References Cited

U.S. PATENT DOCUMENTS

| | | | | |
|---|---|---|---|---|
| 5,946,054 A | * | 8/1999 | Sannohe et al. | 348/745 |
| 6,402,323 B1 | * | 6/2002 | Shiue et al. | 353/20 |
| 6,633,435 B1 | * | 10/2003 | Akiyama et al. | 359/619 |
| 6,666,556 B1 | * | 12/2003 | Hansen et al. | 353/20 |
| 6,758,565 B1 | * | 7/2004 | Cobb et al. | 353/34 |
| 6,910,773 B1 | * | 6/2005 | Nakashima et al. | 353/20 |
| 2005/0024591 A1 | * | 2/2005 | Lian et al. | 353/20 |
| 2005/0174541 A1 | * | 8/2005 | Lu et al. | 353/20 |

* cited by examiner

Primary Examiner—W. B. Perkey
Assistant Examiner—Magda Cruz
(74) Attorney, Agent, or Firm—J.C. Patents

(57) ABSTRACT

An optical projection system has a parallel light source for producing a parallel light beam. A first color splitter splits the parallel light beam into a first color beam and a color mixing beam. The color mixing beam includes a second color beam and a third color beam. A first both-side telecentric group is disposed on a first light path of the first color beam, so as to transform into a first light beam. A second both-side telecentric group is disposed on a second light path of the color mixing beam. A second color splitter is disposed on the second light path to split the color mixing beam into a second light beam and a third light beam. A light-combining unit receives the first, second, and third light beams and combines into a mixed beam. Then the mixed beam is projected.

16 Claims, 9 Drawing Sheets

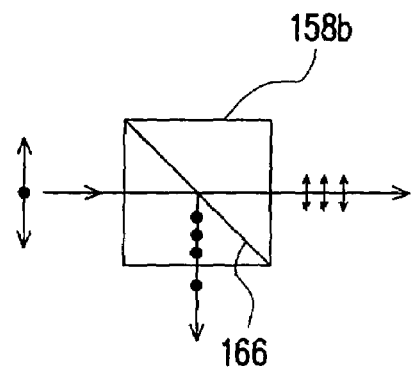
FIG. 2 (PRIOR ART)
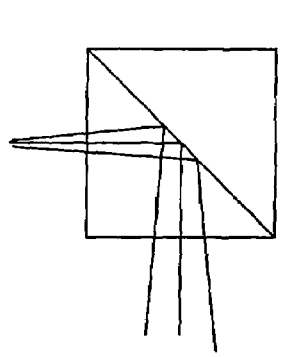 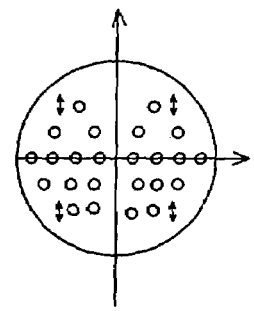
FIG. 3A(PRIOR ART)   FIG. 3B(PRIOR ART)
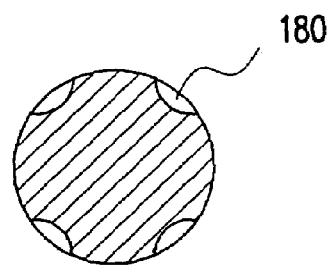
FIG. 3C(PRIOR ART)

OPTICAL PROJECTION SYSTEM AND METHOD

CROSS-REFERENCE TO RELATED APPLICATION

This application claims the priority benefit of Taiwan application 93102568, filed on Feb. 5, 2004.

BACKGROUND OF THE INVENTION

1. Field of Invention

The present invention relates to an optical projection system. More particularly, the present invention relates to using a wire grid polarizing device, so that the light can be mixed by a transmission manner.

2. Description of Related Art

The optical projection system has been very common in our daily life. For example, the small image content can be projected to a large screen for view by the user. Particularly, when the other technologies have also been well developed, such as the development of the liquid crystal displaying technology, they can be implemented together with the optical projection system, so as to achieve the function to display the image. For example, liquid crystal projection TV is one of products by modern technologies.

The conventional optical projection system, which is also implemented with the liquid crystal (LC) displaying device, is designed as shown in FIG. 1. The conventional optical projection system in FIG. 1 is designed by using the property of polarization beam splitter (PBS). A light beam 100 first enters a color splitter 150, which splits the light beam 100 into, for example, a blue beam 104 and a color mixing light 102. This color mixing light is composed of green light and red light. The blue beam 104 travels along a light path, and the color mixing light 102 travels along another light path. The light path for the blue beam 104 is first described. The blue beam 104 then is led by the reflection mirrors 152 and 154, so as to become the blue beam 106 that travels toward a PBS 158b through a field lens 156b. The PBS 158b reflects a light component with a specific polarization state onto a liquid crystal on silicon (LCOS) panel 160b. The LCOS panel has multiple pixels, usually being arranged by an array structure. Each pixel of the LCOS panel can be controlled to change the polarization state of the incident light and then the incident light is reflected, wherein the changed polarization state is associating with the PBS. As a result, the effect of color brightness or gray level can be adjusted.

On the other hand, the color mixing light 102 enters a color splitter again to be split into a red beam 108 and a green beam 110. Wen the red beam 108 and the green beam 110 are split, the light paths are similar to the blue beam 104, and respectively enter the PBS 158r and 158g as well as the LCOS panels 160r and 160g, so as to form the image patterns with respect to the primary colors.

Then, the three beams, which are reflected by the LCOS panels 160r, 160g, and 160b, enter a color-combination prism 162, so as to combine the three beam into a color mixing light. The color mixing light then propagates out from another face of the color-combination prism 162 and reaches to the projection lens set 164. Wherein, the color-combination prism 162 usually includes an X-cube.

With respect to the conventional design in FIG. 1, the design mainly uses the PBS and has several disadvantages. The operation mechanism of the PBS is shown in FIG. 2. A non-polarized light beam enters a slant surface 166 of the PBS. It can allow the light with a specific polarization state to pass but reflect the light with another polarization state. However, for the actual light, the light beam is not a spot beam and is incident by a two-dimensional plane. FIGS. 3A–3C show the situation for the actual beam entering the PBS. In FIG. 3A, when the light is incident by a 2-dimensional plane, at the cross-sectional plane as shown in the drawing, the behaviors can be like the function in FIG. 2. However, the other cross-sectional plane (not shown) then cannot be completely split into two light beams with different polarization states. In FIG. 3B, for the reflected light beam in 2-dimensional circular area, the horizontal axis represents the direction in FIG. 2. It has pure polarization state, represent by, i.e., circle points. However, the position deviating from the horizontal axis will be mixed with a little portion of light with the other polarization state, indicated by vertical double-arrow. Thereby, when a complete dark state or dark field is intended, a little light leakage occurs. In FIG. 3C, the light leakage usually occurs at the regions 180. For the current requirement, the brightness contrast is better than 1000:1. This light leakage would affect the product quality.

In order to solve the forgoing issue of PBS, the interfacing surface 166 is necessary to use the glass with low birefringence to maintain the good polarizing property. Moreover, in order to reduce the light leakage, it is necessary to be coated with a ¼-wave compensation layer to reduce the light leakage. In this situation, the fabrication cost is high and the system is not easy to be maintained. It even needs a grading coating process, which process is difficult to be performed.

Conventionally, an alternative design is using a wire grid polarizer (WGP) to replace the PBS. FIG. 4 is drawing, schematically illustrating a conventional optical projection system using WGP. In FIG. 4, a light source 300 emits a white light, which is split by a color splitter 302 into a blue beam 304 and a color mixing light 306. The color mixing light 306 as a yellow beam is first described. The color mixing light 306 travels through the condenser lens 308, and then is reflected by the reflection mirror 314 to change the travelling direction. The light beam is then enters another color splitter 316 and split into a red beam 318 and a green beam. With respect to the red beam 318, it passes through a WGP 320, wherein a light component with a polarization state would pass and reach to a liquid crystal reflection panel 322. The liquid crystal reflection panel 322, by a polarization state, reflects the incident beam onto a WGP 320. At this moment, the reflected light beam carries an image pattern. The WGP 320 then reflects the light beam onto a color-combination prism 162. For this conventional design, the liquid crystal reflection panel 322 is perpendicular disposed, with respect to the corresponding incident surface of the color-combination prism 162. The light beam enters the color-combination prism 162 by the reflection from the WGP 320. The other blue beam (B) 304 and the green beam (G) splitting from the color mixing light 316 are similarly designed. For the blue beam (B) 304, it can further use the condenser lens 310 and the relay lens 312.

The invention has discovered some issues in this conventional design in FIG. 4, such as the deformed WGP, which would cause the chromatic aberration and so on. With respect to the discovered issues, the invention has proposed a novel design as to be described later.

In addition, the other conventional optical projection systems are shown in FIG. 9 and FIG. 10. In FIG. 9, basically, this conventional design uses a condenser lens 804 to condense the light beam from the light source and then the condensed beam afterward enters the color splitter 806. The subsequent light path is implemented with the LC panel 812.

For this design, since the condenser lens 804 is designed with a single-side telecentricity or non-telecentricity, the light cone angle is quite large. Then, the subsequent color splitter 806 needs a gradient coating for reducing the color non-uniformity caused by cone angle. The red beam 802R and the green beam 802G are again split by the color splitter 818. The green beam 802G is reflected by the reflection mirror 822. Since the length of the light paths is different, a pair of relay lenses are needed to adjust the phase difference. The design on light path can be referred to FIG. 9, and should be understood by the skilled artisans. The further description is omitted.

Further still, FIG. 10 is a design using the WGP 916 with the liquid crystal reflection panel 918. However, it has the same problems as in FIG. 9. That is, the light beam form the light source 900 is first condensed by the condenser lens 902 and then reaches to the color splitter 904. Since the condenser lens 902 is not designed by telecentricity, a color splitter needs the gradient coating. Furthermore, since it is not a telecentric design, the light path of each color beam is restricted by the color splitter and cannot be independently adjusted. This also causes the design difficulty to get the light paths in equal length.

SUMMARY OF THE INVENTION

The invention provides an optical projection system, designed by transmitting a WGP and being directly entering the color-combination prism, wherein the liquid crystal reflection panels are parallel to the corresponding entering surfaces of the color-combination prism.

The invention also provide another optical projection system, designing with a both-side telecentricity, wherein the first stage color splitter is disposed before a both-side telecentric group. As a result, the light cone angle can remain small and the special design of color splitter with gradient coating is prevented from use. In addition, the light path for each beam can be separately designed to have the same length of light path.

According to features of the invention, an optical projection system is provided, capable of receiving a red beam, a green beam, and a blue beam. The projection system includes a color-combination prism, which allows those light beams to enter from three surfaces and to combine into a mixed beam that emits out from another surface. A projection lens set receives the mixed light beam. With respect to each of the light beams, it further includes a liquid crystal reflection panel and a wire grid polarizer. The liquid crystal reflection panel is parallel to the corresponding surfaces of the color-combination prism. Before the light beams entering the color-combination prism, they are first reflected by the WGP into the liquid crystal reflection panels, and the liquid crystal reflection panels respectively with a polarizing state reflect the light beams, passing through the WGP and directly propagating toward the color-combination prism.

The invention further provides an optical projection method, for receiving a red beam, a green beam and a blue beam, and then performing projection. The method includes a light source. Then, the light source is split into RGB three primary-color light beams. The light beams are led, so as to respectively enter a WGP and are reflected to the liquid crystal reflection panel. The liquid crystal reflection panel has a plurality of pixels. The pixels on the liquid crystal reflection panel are controlled to have a reflection light beam with a polarization state with respect to the pixels. The light beams reflected from the liquid crystal reflection panel are directly passing through the WGP and then are combined as a mixed light beam.

The invention also provides an optical projection system, including a light source for providing a parallel light beam. A first color splitter splits the parallel light beam into a first color beam and a color mixing beam. The color mixing beam includes a second color beam and a third color beam. A first both-side telecentric group is disposed on a first light path of the first color beam, so as to transform into a first light beam. A second both-side telecentric group is disposed on a second light path of the color mixing beam. A second color splitter is disposed on the second light path to split the color mixing beam into a second color beam and a third color beam. A color-combination device receives the first, second, and third color beams and combines into a mixed beam. Then the mixed beam is projected.

The present invention also provide an optical projection method, including providing a parallel light beam. The parallel light beam is split into a first color beam and a color mixing beam. The first color beam is led to enter a first both-side telecentric group. The color mixing beam is led to enter a second both-side telecentric group. The color mixing beam is then split into a second color beam and a third color beam. The first, second, and third color beams are combined into a mixed beam. Then the mixed beam is projected.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2 is a drawing, schematically illustrating a conventional PBS.

FIGS. 3A–3C are drawings, schematically illustrating the issue of light leakage.

DESCRIPTION OF THE PREFERRED EMBODIMENTS

Embodiment 1

Figure 1:
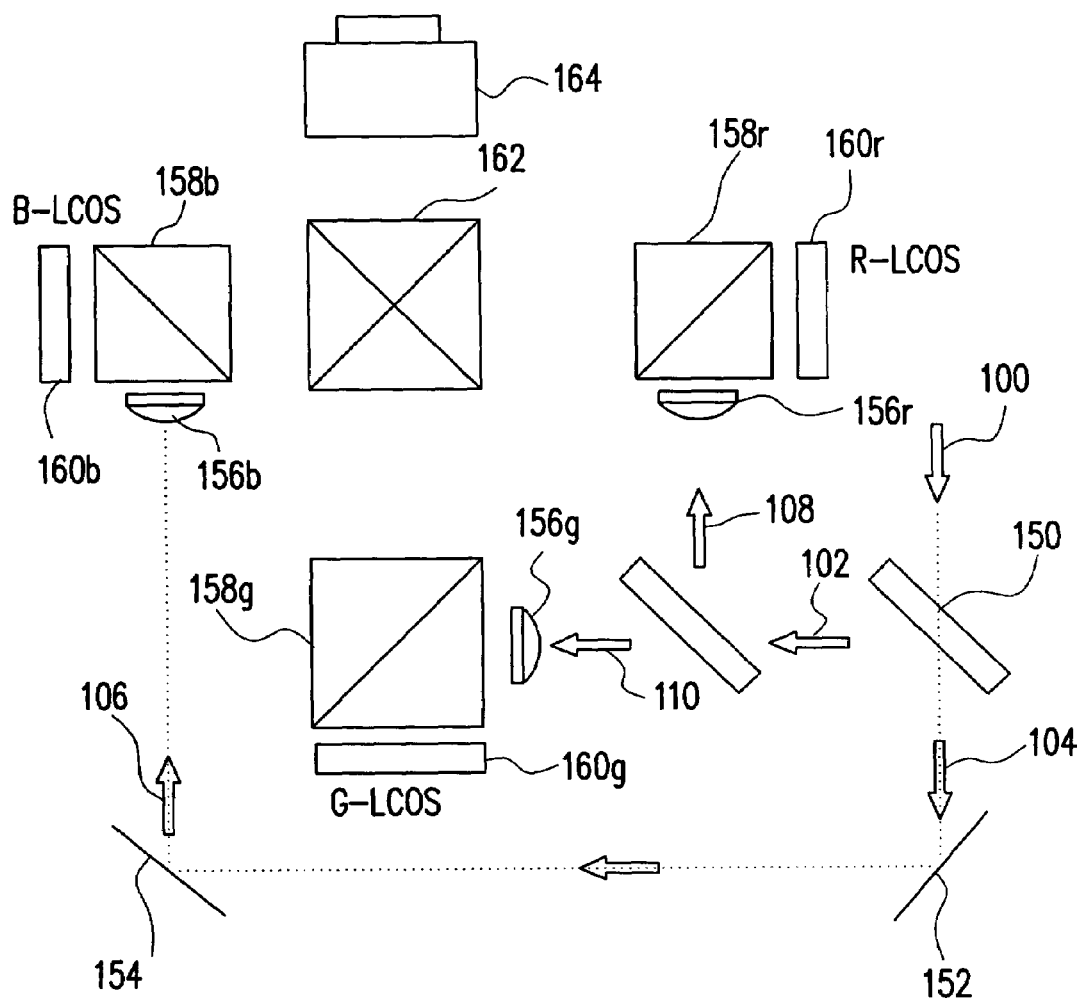
FIG. 1 is a drawing, schematically illustrating a conventional optical projection system.
Figure 4:
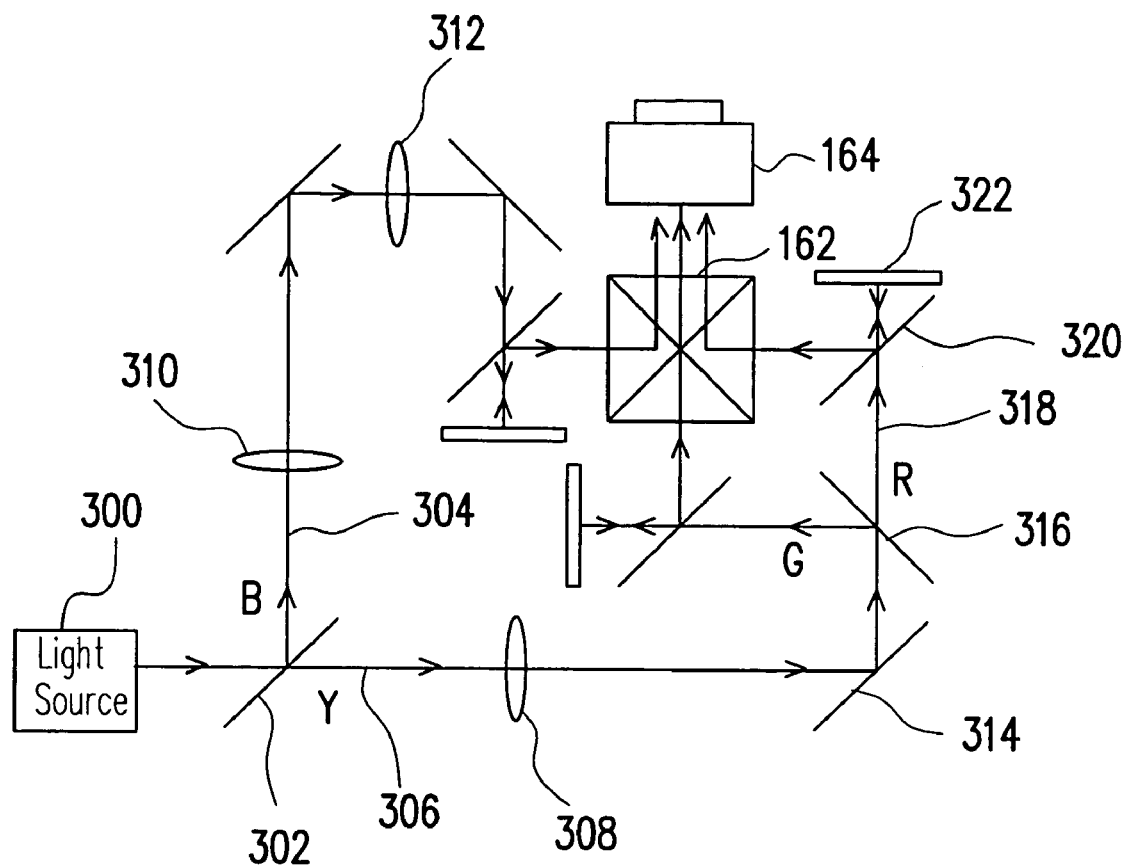
FIG. 4 is a drawing, schematically illustrating another conventional optical projection system.

For the conventional design in FIG. 4, after analyses by the invention, there are several problems found. For example, if WGP 320 is bent due to non-uniform thermal expansion or other reasons, it causes the reflection beam being not parallel. This would then causes serious lateral color aberration.

Figure 5:
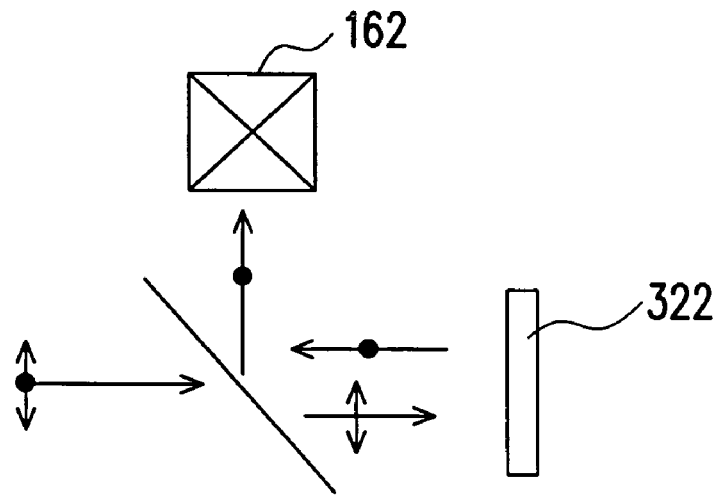
FIG. 5 is a drawing, schematically illustrating the mechanism of a conventional wire grid polarizer.
Figure 6:
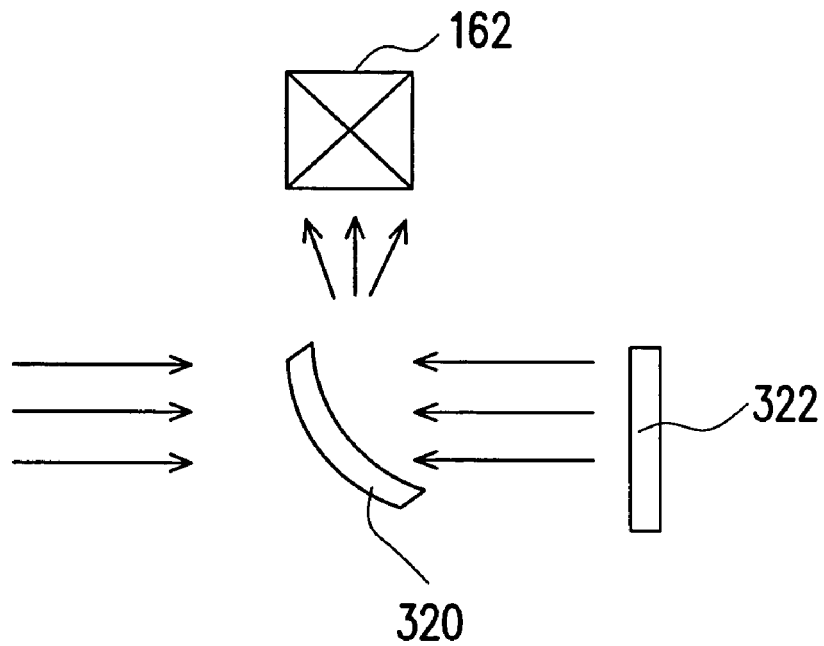
FIG. 6 is a drawing, schematically illustrating the issue of conventional optical projection system, discovered by the invention.

FIG. 5 has shown the conventional operation mechanism for the WGP 320, which is operated together with the liquid crystal reflection panel 322 and the color-combination prism 162. The light beam passes through the WGP with a polarization state and reaches to the liquid crystal reflection panel 322. The liquid crystal reflection panel 322, according to the need for each pixel, changes the polarization state into another polarization state, and the light beam is again reflected back to the WGP. The WGP with its property then reflects the incident light beam onto the color-combination prism 162.

At this situation, if the WGP 320 is bent, then since the incident angle is changed also, the light travels along a direction deviate from the desired light path. The pixels then interfere with each other. With respect to the quality requirement of the image, the lateral color aberration should not be shifted more than one pixel. The current pixel size is 10×10 $\mu m^2$. In other words, the deviation of light beam should be less than 10 microns. However, it is not easy to achieve.

Figure 7:
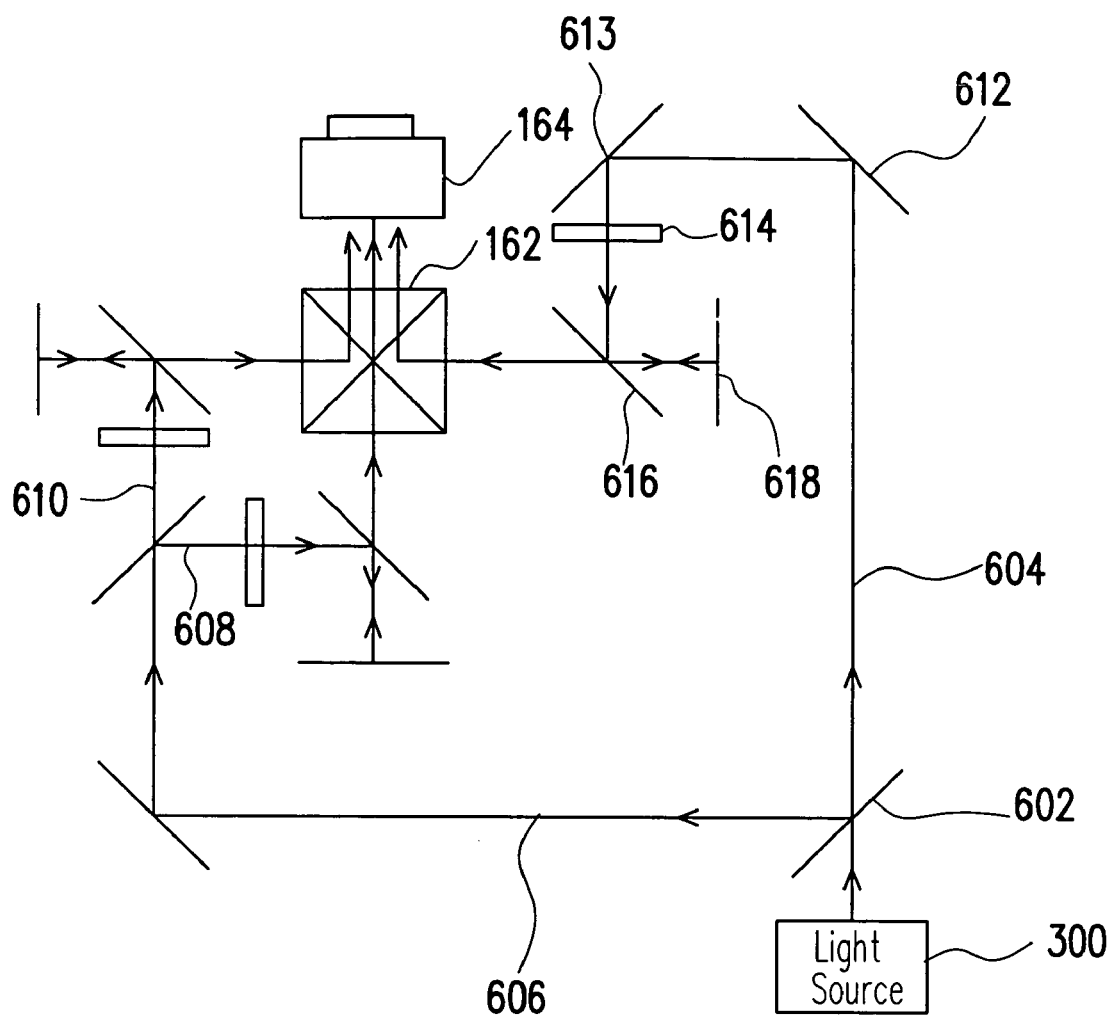
FIG. 7 is a drawing, schematically illustrating an optical projection system, according to a first preferred embodiment of the invention.

The invention then proposes a transmission design as shown in FIG. 7. In FIG. 7, the light source 300 provides a light beam, which is split into a primary color beam 604 and a color mixing beam 606 by a color splitter 602. The primary color beam 604 enters a polarizer 614 through the reflection mirrors 612 and 613. The polarizer 614 is used, according to the actual design, to produce a polarization state, which is in accordance with the property of the WGP 616 in use. After the light beam passes through the polarizer 614, then it is incident to the WGP 616, which reflects a component of the light beam with a specific polarization state on to the liquid crystal reflection panel 618. By using the property of the liquid crystal reflection panel 618, after the polarization state is properly changed, the light beam is reflected backed to the WGP 616. It then transmits the WGP 616 and directly propagates toward the color-combination prism 162. The invention particularly arranges the liquid crystal reflection panels 618 to be parallel to the incident surface of the color-combination prism 162. In addition, the color mixing beam 606 is again split into light beams 608 and 610 by another color splitter. However, the subsequent light paths are designed similar to the light path 604. The detailed description is omitted.

Figure 8:
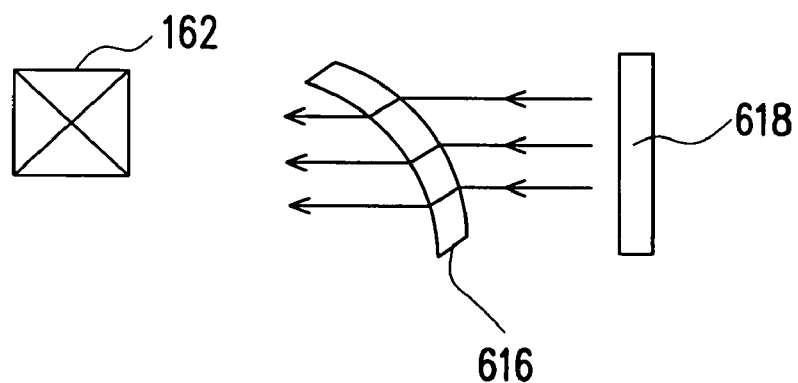
FIG. 8 is a drawing, schematically illustrating an improvement in FIG. 6.

With respect to FIG. 7 of the invention designed by transmission manner, the liquid crystal reflection panel 618 is disposed in parallel to the incident surface of the color-combination prism 162. The operation mechanism is shown in FIG. 8. When the light beam is reflected by the liquid crystal reflection panel 618 and enters WGP 616, even if the WGP 616 is bent, the effect of shift is small. The light beam, passing through the WGP 616, can still remain nearly parallel property to enter the color-combination prism 162. Therefore, the lateral color aberration can be effectively reduced.

Even though the design in FIG. 7 also use the WGP and the liquid crystal reflection panel, according to the conventional problem discovered in the invention, the arrangement on the light path can effectively reduce that the light deviates from the light path and the problem of lateral color aberration occurs.

Embodiment 2

Figure 9:
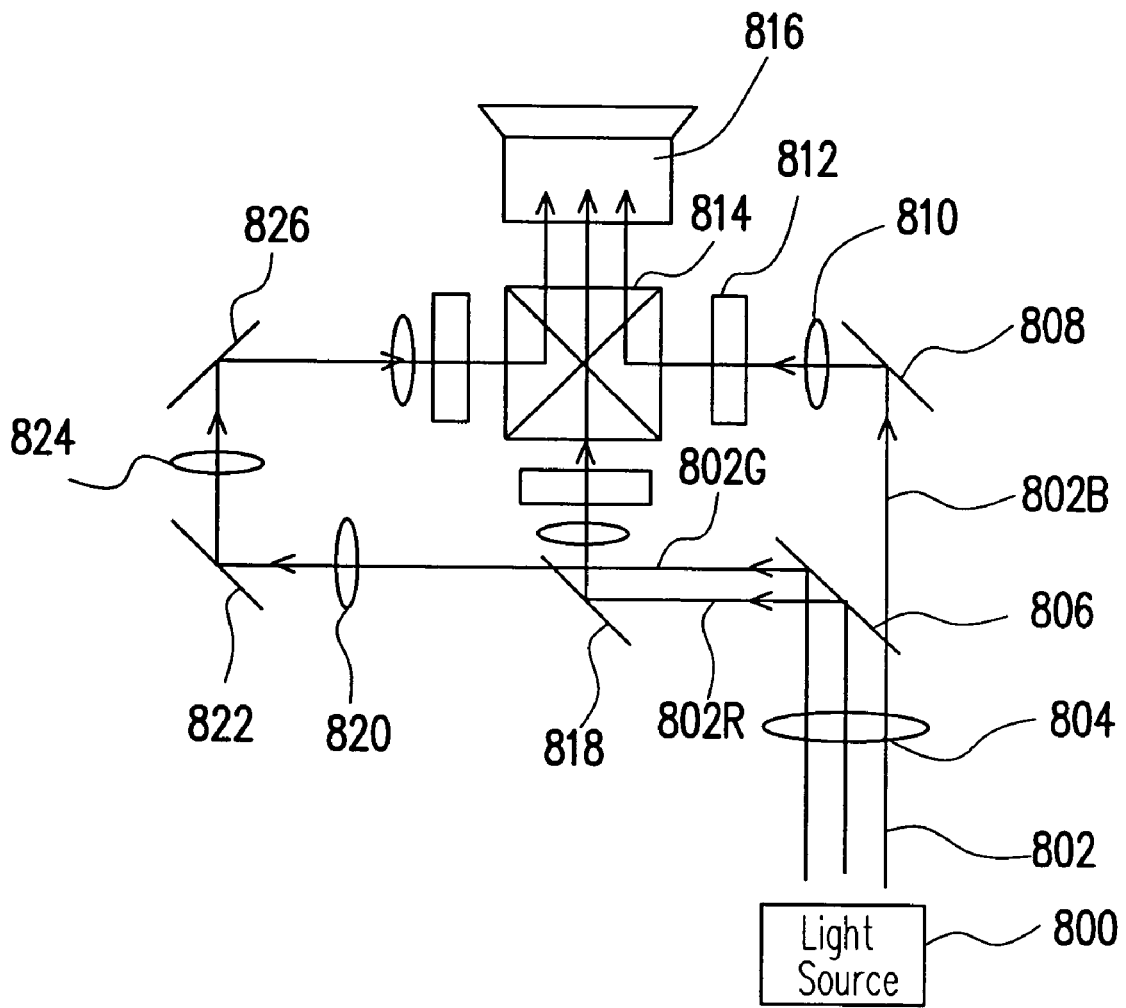
FIGS. 9–10 are drawings, schematically illustrating another conventional optical projection systems.
Figure 10:
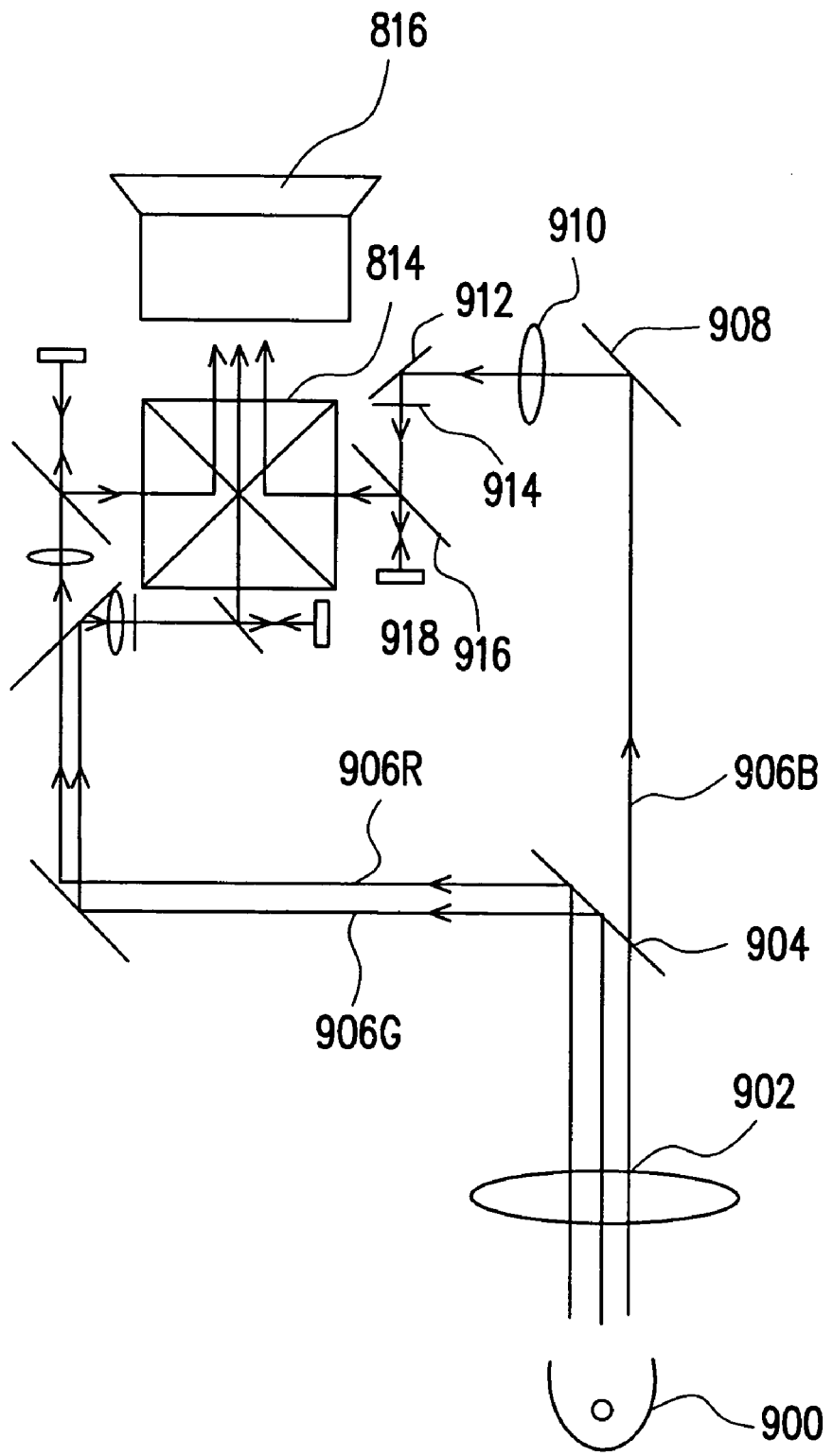

The invention also introduces a both-side telecentric design with respect to the conventional design in FIGS. 9–10, wherein the light beam is first split by the color splitter. As a result, the light cone angle, incident to the color splitter, can be small. The color splitter then can be fabricated in an easier process without the gradient coating. Also and, due to the both-side telecentric design, the light path can be designed separately, so as to achieve the same length of the light paths.

Figure 11:
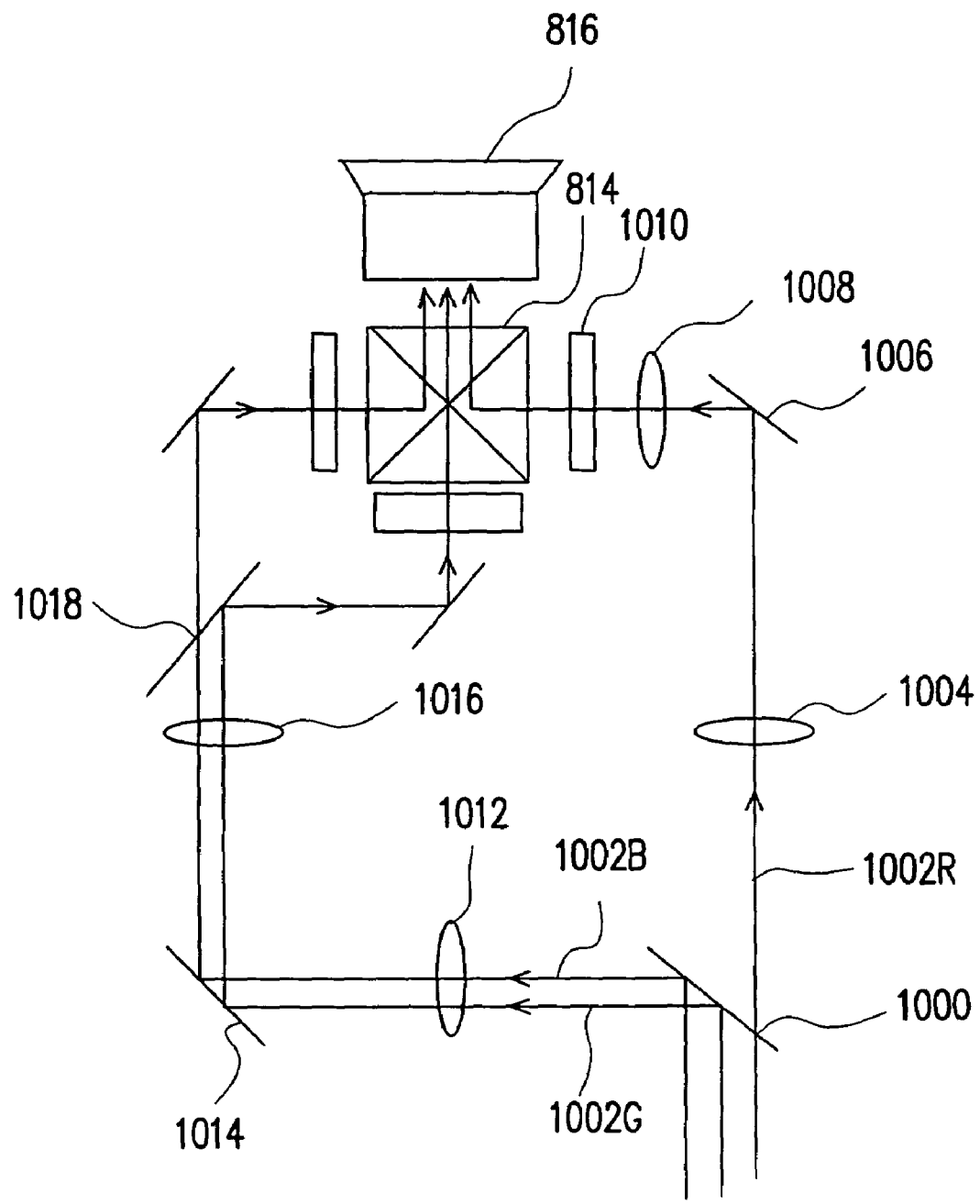
FIGS. 11–12 are drawings, schematically illustrating another optical projection systems, according to a second preferred embodiment of the invention.
Figure 12:
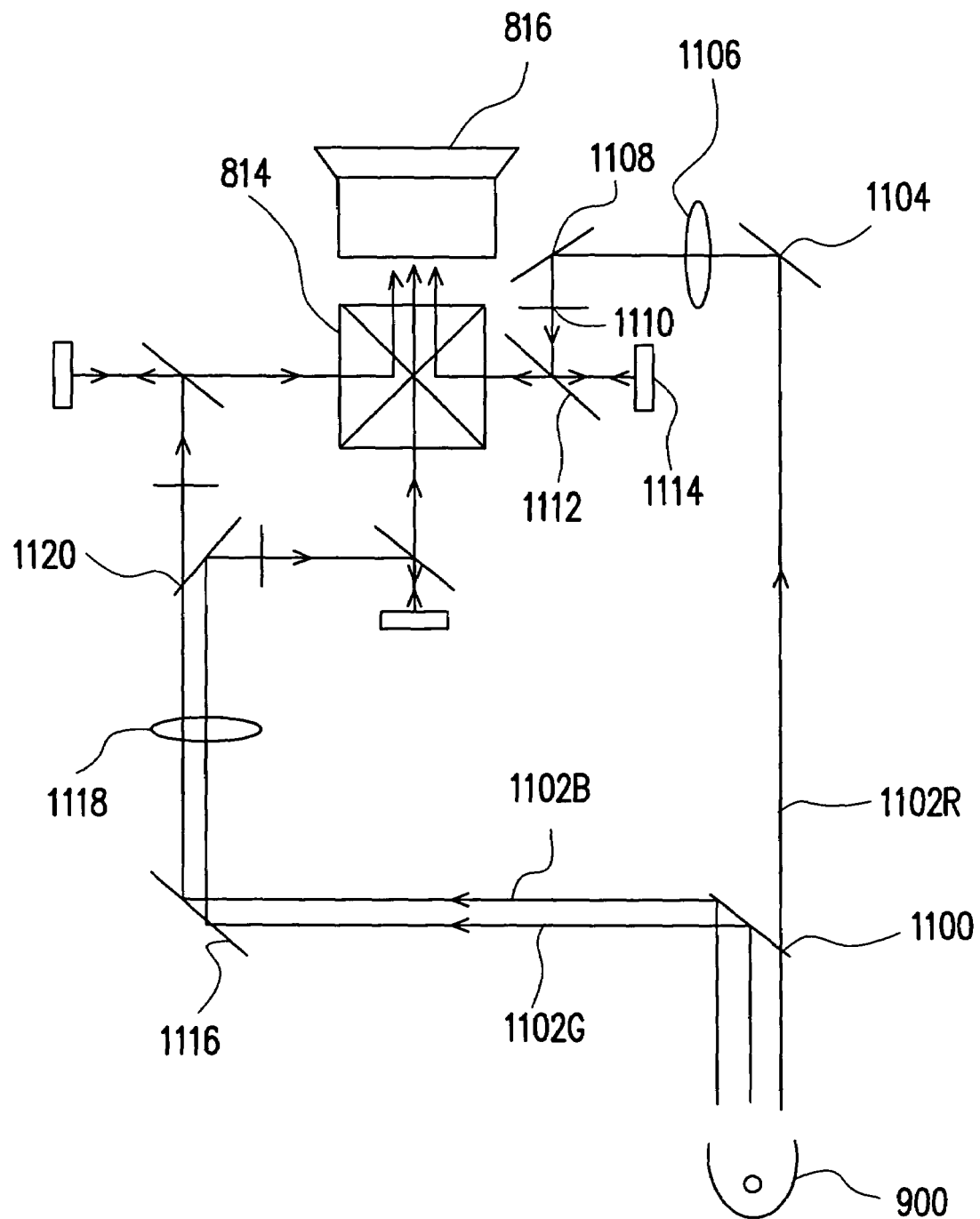

FIGS. 11–12 are drawings, schematically illustrating another optical projection systems, according to a second preferred embodiment of the invention. In FIG 11, the parallel white light beam enters the color splitter 1000, and then split into a primary color beam and a color mixing beam, such as a red beam 1002R and a B/G mixing beam including the blue beam 1002B and green beam 1002G The red beam 1002R is first described in both-side telecentric design. The both-side telecentric group can be formed, for example, by the condenser lens 1004 and the field lens 1008. A reflection mirror 1006 can be optionally used at a proper position to change the red beam 1002R into the desired direction. In addition, the B/G mixing beam, similar to the red beam, also travels through another both-side telecentric group by a condenser lens 1012 and a field lens 1016, and then is split by another color splitter 1018. Then, these three color beams respectively enter the color-combination prism 814 from three surfaces. The mixed light beam emits out from another surface of the color-combination prism 814 and reaches to a projection lens set 806.

In this embodiment, it can have different designs how to lead and mix the light beam after the both-side telecentric group. FIG. 12 is another design. The light source 900 provides a parallel white light beam and the light beam enters the color splitter 1100 to be split into a primary color beam and a color mixing beam, such as red beam 1102R and a B/G mixing beam including a blue beam 1102B and a green beam 1102G The red beam 1102R is described first. The red beam 1102R then travels through a both-side telecentric group, composed by lens set 1106. Alternatively, a reflection minor 1104 can be used at the proper position, so as to change the light beam into the desired direction. In addition, the B/G mixing beam, similar to the red beam 1002R, is reflected by a reflection mirror 1116 and then travels through another both-side telecentric group 1118, and then enters another color splitter 1120 for splitting. Then, these three light beams respectively enter the color-combination prism 814 from three surfaces. The mixed light beam emits out from another surface of the color-combination prism 814 and reaches to a projection lens set 816.

In the design of FIG. 12, the light path after the both-side telecentric design can be called a mixing and projection unit. Even though the design of the mixing and projection unit is not limited to the design in this embodiment, the design in FIG. 7 is preferred. In FIG. 12, for example, the red beam is deflected by the reflection mirror 1108 and enters a polarizer 1110. The polarizer 1110 can allow that the light beam with a polarization state is incident onto the WGP 1112 and is reflected to the liquid crystal reflection panel 1114.

The liquid crystal reflection panel 1114 then reflects the light beam to transmit the WGP 1112, and is directly toward the color-combination prism 814 at the corresponding incident surface.

In general view of the invention, the design in FIG. 7, it at least has the advantages of low fabrication cost, the dark field being uniform, no need of the ¼ wave plate, and good contrast.

Further still, for the design with both-side telecentric design, it also at least has several advantages of low fabrication cost due to no need of gradient coating film. When the image has small off focusing, it would not affect the image quality. The optical valve can be easily aligned. The split light path can be separately designed according to the actual need. There is no need of gradient coating film on the color splitter but the phenomenon of the non-uniform color would not occur.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. An optical projection system, comprising:
   a light source, to provide a parallel light beam;
   a first color splitter, to split the parallel light beam into a first primary color beam and a color mixing beam, wherein the color mixing beam includes a second primary color beam and a third primary color beam;
   a first both-side telecentric group, implemented after the first color splitter and on a first light path of the first primary color beam, so as to produce a first light beam;
   a second both-side telecentric group, implemented after the first color splitter and on a second light path of the color mixing beam;
   a second color splitter, disposed at a position, so as to split the color mixing beam into a second light beam and a third light beam; and
   a mixing and projection unit, receiving the first light beam, the second light beam, and the third light beam to combine and project.

2. The system of claim 1, wherein each of the first and the second both-side telecentric groups includes at least one reflection mirror to adjust a light path direction.

3. The system of claim 1, wherein the light beams have equal path length.

4. The system of claim 1, wherein the mixing and projection unit includes:
   three liquid crystal panel sets disposed with respect to the light beams, a projection lens set, a color-combination prism to mix the light beams into a mixed beam and then lead the mixed beam to the projection lens set, at least one reflection mirror to lead at least one of the second light beam and the third light beam onto the color-combination prism.

5. The system of claim 1, wherein the mixing and projection unit includes:
   a color-combination prism including four surfaces, a projection lens set disposed with respect to one of the four surfaces of the color-combination prism, three liquid crystal reflection panels disposed with respect to the other three of the four surfaces of the color-combination prism, and three wire grid polarizers (WGPs) grouping with the three liquid crystal reflection panels, so as to cause the light beams to enter the color-combination prism.

6. The system of claim 5, wherein the three liquid crystal reflection panels are respectively parallel to the three surfaces of the color-combination prism.

7. The system of claim 5, wherein the mixing and projection unit further includes three polarizers, disposed before the three WGPs.

8. The system of claim 1, wherein the first and second color splitters have no a gradient coating film therein.

9. An optical projection method, comprising:
   providing a parallel light beam;
   splitting the parallel light beam into a first light beam and a color mixing beam;
   leading the first light beam to enter a first both-side telecentric group;
   leading the color mixing beam to enter a second both-side telecentric group;
   splitting the color mixing beam into a second light beam and a third light beam;
   combining the first light beam, the second light beam and the third light beam, so as to form a mixed light beam; and
   projecting the mixed light beam.

10. The method of claim 9, wherein the step of mixing the first light beam, the second light beam and the third light beam includes using a plurality of liquid crystal panels to produce an image pattern.

11. The method of claim 9, wherein the step of mixing the first light beam, the second light beam and the third light beam includes using a plurality of liquid crystal on silicon (LCOS) panels to produce an image pattern.

12. The method of claim 11, further using a plurality of wire grid polarizers (WGPs) with the LCOS panels to produce the image pattern.

13. The method of claim 9, wherein the step of combining the first light beam, the second light beam and the third light beam includes using a color-combination prism.

14. The method of claim 9, wherein the step of splitting the parallel light beam into the first light beam and the color mixing beam includes using a color splitter without gradient coating film therein.

15. The method of claim 9, wherein the step of splitting the color mixing beam into the second light beam and the third light beam includes using a color splitter without gradient coating film therein.

16. The method of claim 9, wherein the step of mixing the first light beam, the second light beam and the third light beam includes using a plurality of liquid crystal reflection panels and a plurality of wire grid polarizers (WGPs) respectively with the liquid crystal reflection panels to produce an image pattern,
   wherein, the liquid crystal reflection panels reflect the three light beams, respectively, to a light combining element by staring light paths.

* * * * *